US010710179B2

(12) United States Patent
Sebhatu

(10) Patent No.: US 10,710,179 B2
(45) Date of Patent: Jul. 14, 2020

(54) CONVERTING BETWEEN ROTARY AND LINEAR MOTION, AND A SAWING DEVICE

(71) Applicant: Genius IP Ltd., Edgware, Middlesex (GB)

(72) Inventor: Teklemichael Sebhatu, London (GB)

(73) Assignee: Genius IP Ltd., Edgware (GB)

( * ) Notice: Subject to any disclaimer, the term of this patent is extended or adjusted under 35 U.S.C. 154(b) by 0 days.

(21) Appl. No.: 15/681,224

(22) Filed: Aug. 18, 2017

(65) Prior Publication Data

US 2017/0341167 A1    Nov. 30, 2017

Related U.S. Application Data

(63) Continuation of application No. 13/816,721, filed as application No. PCT/GB2012/052604 on Oct. 19, 2012, now Pat. No. 9,764,400.

(30) Foreign Application Priority Data

Oct. 19, 2011    (GB) .................................. 1118062.7

(51) Int. Cl.
  *B23D 51/16*    (2006.01)
  *B23D 49/00*    (2006.01)
  (Continued)

(52) U.S. Cl.
  CPC ........... *B23D 51/16* (2013.01); *B23D 49/003* (2013.01); *B23D 49/11* (2013.01); *F16H 21/16* (2013.01);
  (Continued)

(58) Field of Classification Search
  CPC ............. Y10T 83/8831; Y10T 83/8832; Y10T 83/8841; Y10T 83/8843; Y10T 83/9457;
  (Continued)

(56) References Cited

U.S. PATENT DOCUMENTS

| | | | | |
|---|---|---|---|---|
| 3,503,294 A | * | 3/1970 | Henigan | ................ B23D 49/00 125/18 |
| 4,951,395 A | * | 8/1990 | Lameiro | ................ B26F 1/386 30/360 |

(Continued)

*Primary Examiner* — Phong H Nguyen
(74) *Attorney, Agent, or Firm* — Lowe Graham Jones PLLC

(57) ABSTRACT

Apparatus for converting rotary motion to linear motion and/or linear motion to rotary motion, comprising: a rotatable piece (24) having a surface, the piece being rotatable about an axis thereof; at least one member (26*a-d*) having a linking surface (44*a-d*) facing the surface of the rotatable piece and arranged for restricted movement at least in part laterally relative to the axis of the piece; and located between the surface of the rotatable piece and the or each reciprocating member, means for linking the linking surface of the respective member and the surface of the rotatable piece, wherein the means for linking (30*a-d*), the surface of the rotatable piece and the linking surface are configured to cooperate so that rotational motion of the rotatable piece causes linear movement of the at least one member, and/or linear movement of the at least one member causes rotational motion of the rotatable piece. A sawing device may include said apparatus, the sawing device being for cutting by repetitive reciprocating cutting action of at least one blade on a surface of an object to be cut. A saw blade (10*a-d*) may be configured for such a sawing device.

16 Claims, 10 Drawing Sheets

(51) Int. Cl.
*B23D 49/11* (2006.01)
*F16H 25/14* (2006.01)
*F16H 21/16* (2006.01)

(52) U.S. Cl.
CPC ........ *F16H 25/14* (2013.01); *Y10T 74/18056* (2015.01); *Y10T 83/8831* (2015.04); *Y10T 83/8841* (2015.04)

(58) Field of Classification Search
CPC .......... Y10T 83/9473; Y10T 74/18056; B23D 51/00; B23D 51/16; B23D 49/00; B23D 49/11; F16H 21/16; F16H 21/08; F16H 21/14
USPC .............. 30/392, 393, 394, 501, 503, 503.5
See application file for complete search history.

(56) References Cited

U.S. PATENT DOCUMENTS

| | | | | |
|---|---|---|---|---|
| 5,048,190 | A * | 9/1991 | Aurness | B23D 49/006 30/299 |
| 5,797,189 | A * | 8/1998 | Gilbert | B23D 49/003 144/363 |
| 5,860,218 | A * | 1/1999 | Vinciguerra | B23D 49/003 30/392 |
| 5,867,913 | A * | 2/1999 | Pettigrew | B23D 49/003 144/363 |
| 2012/0125171 | A1* | 5/2012 | Chen | B23B 41/04 83/610 |

* cited by examiner

CONVERTING BETWEEN ROTARY AND LINEAR MOTION, AND A SAWING DEVICE

PRIORITY CLAIM

This application claims the benefit of U.S. patent application Ser. No. 13/816,721, filed Feb. 12, 2013, which in turn claims the benefit of international PCT application number PCT/GB2012/052604, filed Oct. 19, 2012, the contents of which are incorporated by reference.

FIELD OF THE INVENTION

The invention relates to apparatus for converting rotary motion to linear motion and/or linear motion to rotary motion. The invention also relates to a sawing device for cutting by repetitive reciprocating cutting action of at least one saw blade on a surface of an object to be cut. The invention also relates to a method of replacing a blade in a sawing device, apparatus for a saw blade, and to a saw blade.

BACKGROUND OF THE INVENTION

Plasterboard, also known as drywall, gypsum board or wallboard, is a panel made of gypsum plaster pressed between two thick sheets of paper. Plasterboard panels are typically mounted on structural members to make interior walls and ceilings of buildings. It is sometimes necessary, particularly when a building is erected, to cut openings in plasterboard to provide access to electrical switch and outlet boxes mounted on the structural members. An opening may be cut before the plasterboard is mounted on the structural members, or it may be necessary to cut the opening while the plasterboard is in situ mounted on the structural members.

The usual process of cutting openings comprises firstly marking on the plasterboard where the opening is to be cut. Then, a workman cuts the opening using a saw. The opening typically has rough edges. This process is time consuming, typically taking a practiced workman 15 to 30 minutes. The process is also error prone and typically makes a mess. Also, the saw can extend beyond the plasterboard to make contact with an object on the far side of the plasterboard from the workman. This can cause damage to the object. Since there may be electrical wiring, this also presents danger to the workman.

A known document, U.S. Pat. No. 3,503,294, describes a sawing apparatus. This sawing apparatus includes a crank member that is coupled to a rotational power source. Sawing action of four blades is driven by eccentric movement of the crank member. The sawing apparatus is unstable in use, which may lead to a user applying different blades to an object to be cut at different pressures. This may disadvantageously lead to the object being cut more quickly in some regions than in others. In addition, the eccentric motion of the crank causes vibration of the device. The issues of instability and vibration make the apparatus difficult and unpleasant to use, and may lead to unsatisfactory and inaccurate cutting.

It is an object of the present invention to address these issues.

SUMMARY OF THE INVENTION

According to a first aspect of the present invention, there is provided apparatus for converting rotary motion to linear motion and/or linear motion to rotary motion, comprising: a rotatable piece having a surface, the piece being rotatable about an axis thereof; at least one member having a linking surface facing the surface of the rotatable piece and arranged for restricted movement at least in part laterally relative to the axis of the piece; and located between the surface of the rotatable piece and the or each reciprocating member, means for linking the linking surface of the respective member and the surface of the rotatable piece, wherein the means for linking, the surface of the rotatable piece and the linking surface are configured to cooperate so that rotational motion of the rotatable piece causes linear movement of the at least one member, and/or linear movement of the at least one member causes rotational motion of the rotatable piece.

As will be clear from the following disclosure, although the inventor set out to devise an improved sawing device, he devised a new way to convert between linear and rotary motion. The number of parts required is small, the apparatus can be easily and inexpensively manufactured, and the transmission efficiency is high.

There is also provided a sawing device for cutting by repetitive reciprocating cutting action of at least one blade on a surface of an object to be cut, the sawing device comprising: the apparatus described above; a rotary drive shaft engaged with the rotatable piece to cause rotation thereof; and at least one blade coupled to the or each member lengthwise with the direction of linear movement of the member; wherein the apparatus is arranged to convert rotational motion of the rotary drive shaft to repetitive reciprocal movements of the or each member, which causes corresponding movement of the at least one blade.

The drawbacks to the sawing apparatus described in U.S. Pat. No. 3,503,294 are thus addressed. Even pressure can easily be applied by each blade to an object to be cut. The sawing device is stable to use, in particular since the conversion of rotary motion to reciprocating motion is achieved in a smooth, continuous process.

According to a second aspect of the present invention, there is provided a sawing device for cutting by repetitive reciprocating cutting action of at least one saw blade on a surface of an object to be cut, the sawing device including a rotary drive shaft and means for converting rotational motion of the rotary drive shaft to repetitive reciprocal movements for imparting to the at least one blade, wherein the axis of the rotary drive shaft extends in or in the direction of the vicinity of the center of mass of the sawing device.

According to a third aspect of the present invention, apparatus for a sawing device, comprising: a support means having a slot therethrough; and a blade carrying means arranged on said support means, wherein the support means permits reciprocating movement of the blade carrying means, wherein the blade carrying means is arranged to attach to and carry a blade and transmit a corresponding reciprocating action to the blade through the slot.

According to a fourth aspect of the present invention, there is provided a saw blade for attaching to a sawing device mentioned above, the blade comprising a body having a cutting edge and a first attaching means for engaging with a corresponding second attaching means of a blade carrying means of the sawing device.

Such a saw blade enables a user of the sawing device to quickly and conveniently replace a blade, while also resulting in the blade being held very securely. Such an arrangement is particularly convenient over saw blade attachment arrangements in which a blade must be attached manually at both its ends to blade holders.

BRIEF DESCRIPTION OF THE DRAWINGS

For better understanding of the present invention, embodiments will now be described, by way of example only, in which.

DETAILED DESCRIPTION OF THE PREFERRED EMBODIMENT

Figure 1:
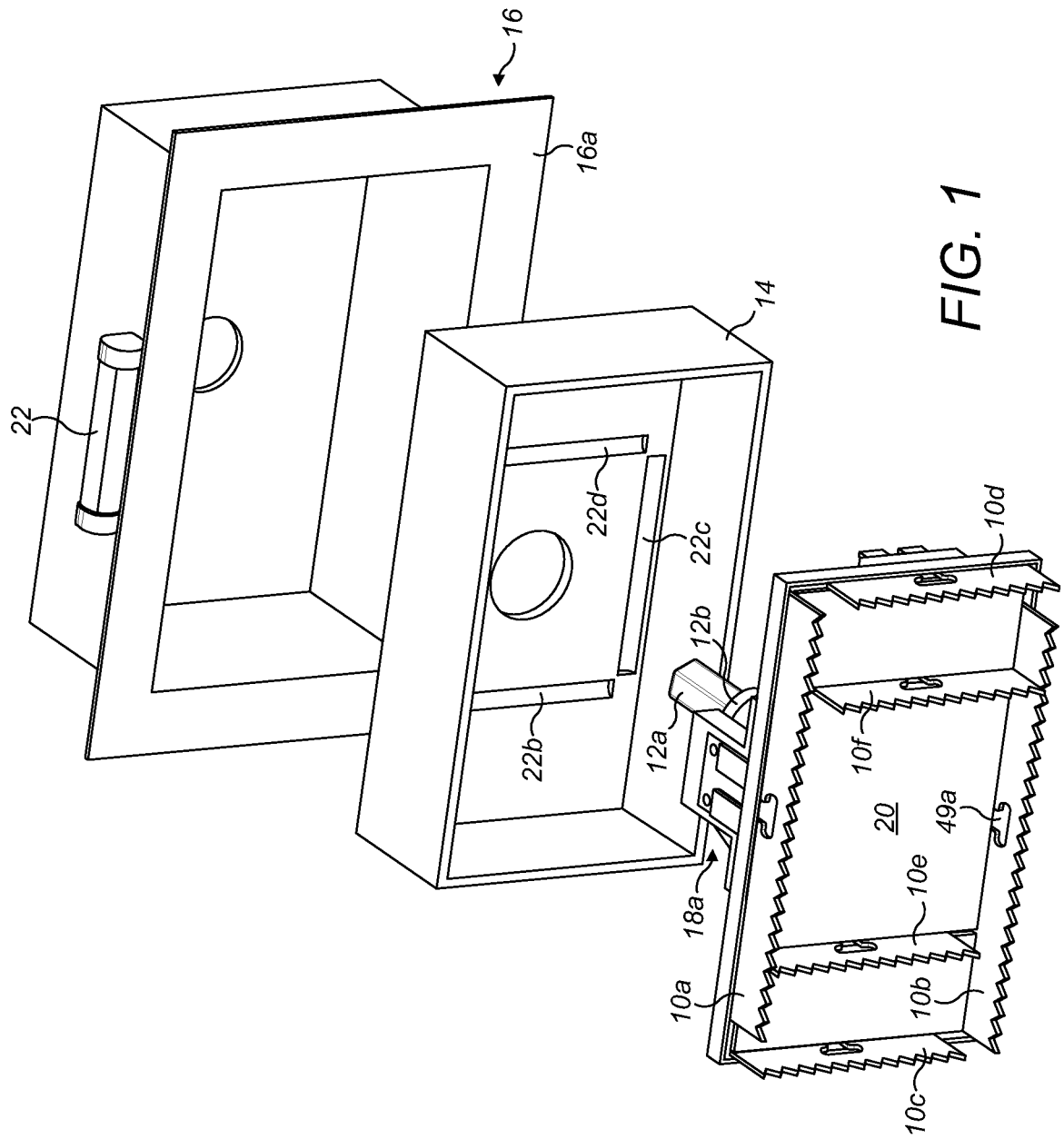
FIG. 1 is an exploded underside perspective view of a sawing device according to a first embodiment of the invention.

Like parts are denoted by like reference numerals throughout.

By way of general overview of some embodiments, the sawing device described includes a rotary to linear motion converting arrangement. The application of the converting arrangement is not limited to use in the sawing device; there are many applications for such converting arrangements. Also, the converting arrangement may be used to convert linear motion to rotary motion, as well as rotary motion to linear motion.

Generally, the sawing device is suitable for cutting a predetermined shape by simultaneous repetitive reciprocating cutting action of four blades. The four saw blades are relatively disposed for simultaneous engagement of a surface of an object such as plasterboard to be cut. Preferably the surface is a substantially flat surface. The sawing device includes a rotary drive shaft and the motion converting arrangement for converting rotational motion of the rotary drive shaft to repetitive reciprocal movements of the blades. In some embodiments, the central axis of the rotary drive shaft extends through or in the vicinity of the center of mass of the sawing device.

Referring to FIG. 1, the sawing device comprises blades 10a-f, a rotary drive shaft 12a, 12b, an inner housing 14, an outer housing 16, a blade carrying parts 18a-d carrying each blade 10a-f, and a motion converting arrangement, which will be described in greater detail below and is largely hidden in FIG. 1, but includes a support means in the form of a mounting plate 20.

In FIG. 1 (and also in FIG. 3), the sawing device is shown with six blades 10a-f to illustrate how the blades can be fitted. In use, four blades would be mounted in a generally square or rectangular formation to enable cutting of a corresponding shape.

The inner housing 14 and the outer housing 16 each has a centrally located aperture through which the rotary drive shaft 12a, 12b extends when the sawing device is assembled. The outer housing 16 includes a flange 16a extending outwardly in a plane parallel to a plane of the edges of the blades 10a-f. The flange 16a is for pressing against a surface to be cut to limit depth of cutting. The flange 16a also serves to steady the device when cutting.

The outer housing 16 has a spirit level 22 mounted on it running parallel to the flange 16a. The spirit level 22 facilitates location of the sawing device so that a shape in a desired orientation can be cut in an at least partially vertical surface. The desired orientation would normally be such that edges of the shape are parallel or orthogonal to the ground.

Figure 2:
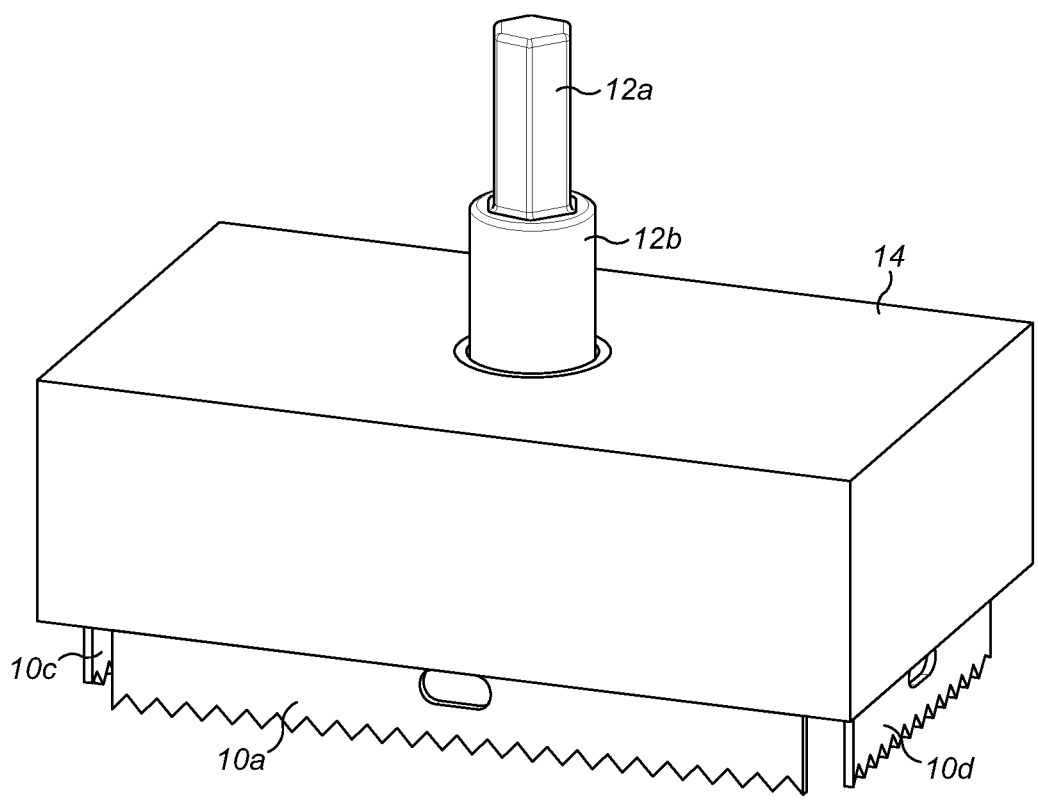
FIG. 2 is a perspective view of the saw device according to the first embodiment in a partially assembled form, with an outer housing absent.

The inner housing 14 has four grooves 22a-d therein in a generally square formation. When assembled, the inner housing 14 fits over the mounting plate 20 with the rotary shaft 12a, 12b extending through the aperture in the inner housing 14, as shown in FIG. 2, so as to enclose the motion converting arrangement (not shown in FIG. 2) and blade carrying parts 18a-d. The inner housing 14 attaches to the mounting plate 20 to substantially prevent relative movement. Various ways of attaching the inner housing 14 and the mounting plate 20 will be apparent to persons skilled in the art, for example by use of screws and suitably threaded apertures. When assembled, the outer housing 16 fits over the inner housing 14.

A means for biasing (not shown) the inner housing 14 into the outer housing 16 is located between the inner and outer housings 14, 16. Thus, since the mounting plate 20 is fixedly disposed relative to the inner housing 14, the biasing means causes the blades 10a-f to retract into the outer housing 16 when not in use. A stopper means (not shown) is also provided to limit the maximum extent that the mounting plate 20 and thus the blades can extend from the outer housing 16. The stopper means, in conjunction with the flange 16a, limits the depth to which an object can be cut.

Each blade 10a-f is a saw blade having a serrated cutting edge for cutting an object to which the cutting edge is applied when the blade 10a-f is engaged in a longitudinally directed, repetitive reciprocating motion. The blades may be formed of metal. Each blade 10a-d includes a first attachment means for engaging the blade to an associated blade carrying part 18a-d, which has a corresponding second attachment for engaging with the first attachment means. Exemplary first and second attachment means are described in detail below.

Figure 3:
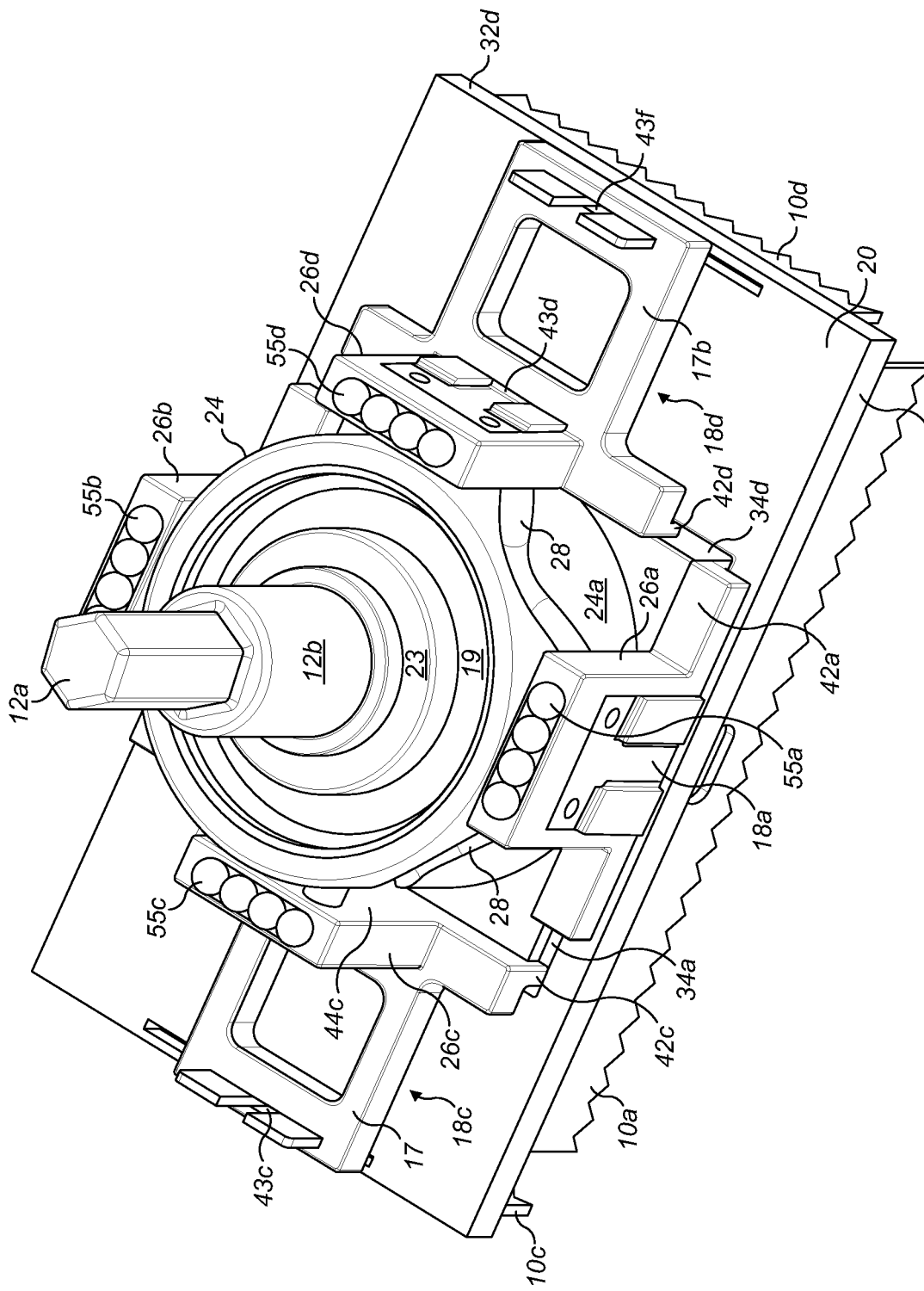
FIG. 3 is a perspective view of the sawing device according to the first embodiment, without inner or outer housing.

Referring also to FIG. 3, the motion converting arrangement includes a cylindrical block 24 mounted on the mounting plate 20, a flanged bushing 23, the mounting plate 20, four reciprocating walls 26a-d each mounted on the mounting plate 20, and, for each reciprocating wall 26-d, a linking means in the form of a ball bearing for transferring force from the cylindrical block 24 to the reciprocating walls 26a-d.

Each reciprocating wall 26a-d is joined to or formed with or attached or otherwise coupled to a respective one of the blade carrying parts 18a-d so that a movement of each reciprocating wall 26-d is transmitted to the corresponding blade carrying part 18a-d.

The rotary drive shaft 12a, 12b has two different diameters. A first end 12a of the rotary drive shaft 12a, 12b is for engagement with a rotary power source (not shown), for example a drill motor, and has a diameter and cross-section suitable for engagement by the rotary power source. A second end 12b of the rotary drive shaft 12 of larger diameter than the first end 12a extends into the cylindrical block 24 and engages with the cylindrical block 24 in a conventional manner, such that rotation of the rotary drive shaft 12 drives rotation of the cylindrical block 24 about the axis of the cylindrical block 24.

Figure 4B:
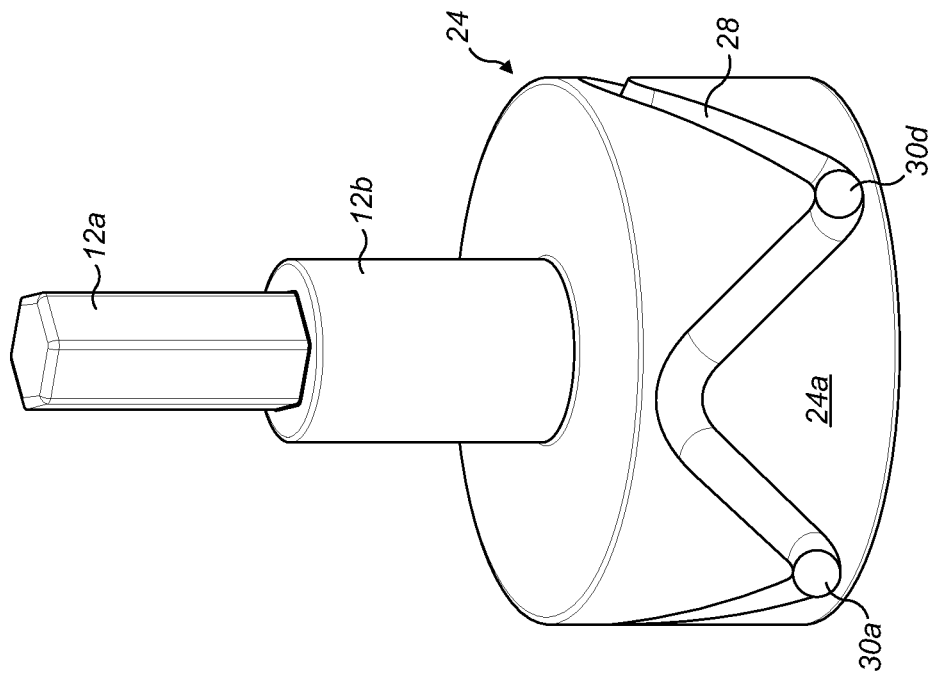
FIGS. 4A and 4B are perspective views of parts of the sawing device, including a rotatable cylindrical block.
Figure 4A:
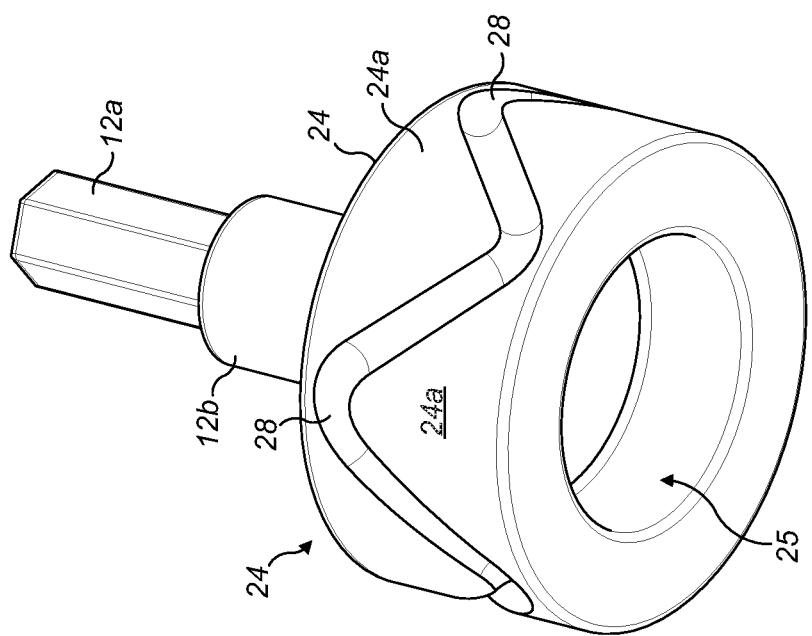

As also shown in FIGS. 4A and 4B, the cylindrical block 24 has a cylindrical surface 24a having a continuous non-linear groove or channel 28 extending in a regular zigzag manner circumferentially around the cylindrical surface 20a. The groove has four peaks and four troughs. The groove 28 is shaped to carry a ball bearing 30a, 30d for each reciprocating wall 26a-d (ball bearings are indicated at 30a and 30d in FIG. 4B and are absent in FIG. 4A; ball bearings 30b and 30c are hidden in FIG. 4B) such that the ball bearings 30a-d do not slip from the groove 28. In alternative embodiments, the groove 28 may have a different number of peaks and troughs, which changes the ratio of rotations to repetitive movements of the walls 26a-d.

The cylindrical block 24 has a cylindrical recess 25 in its base extending coaxially with the axis of the cylindrical block 24, to enable mounting of the cylindrical block 24.

The flanged bushing 19 is tight fitted against the inner housing 14, when the sawing device is assembled. Bearings are preferably located between the flanged bushing 19 and the cylindrical block to reduce friction.

Figure 5:
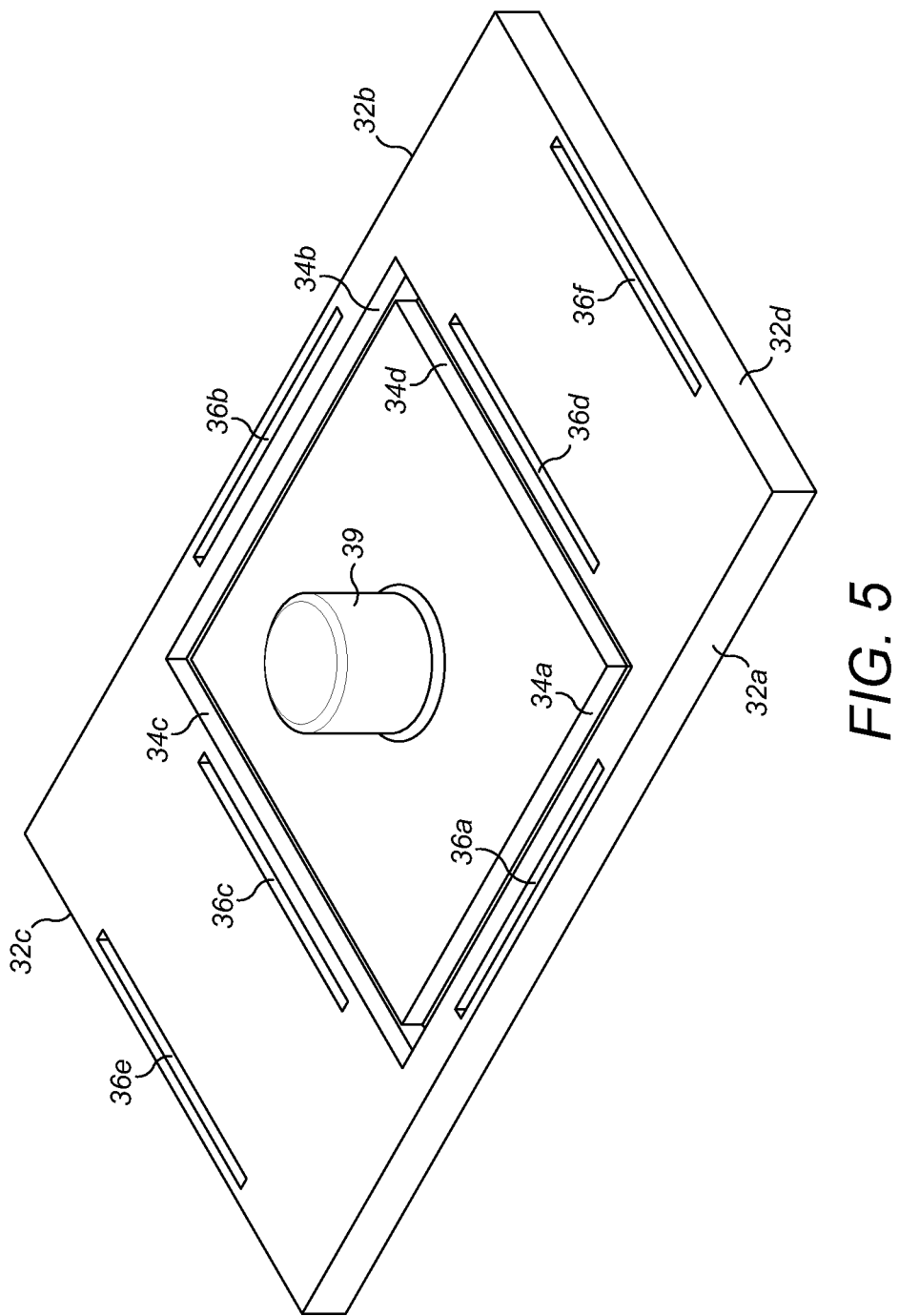
FIG. 5 is a perspective view of a mounting plate for the sawing device, together with a mount for the cylindrical block shown in FIG. 4.

Referring to FIG. 5, the mounting plate 20 is rectangular having two long edges 32a, 32b and two shorter edges 32a, 32b. The mounting plate 20 has a square groove 34a-d therein. The groove 34ad extends to approximately a depth of half of the thickness of the mounting plate 20. Two groove portions 34a, 34b of the square groove 34a-d are parallel to the two long edges 32a, 32b and the other two groove portions 34c, 34d of the square groove 34a-d are parallel to the two shorter edges 32c, 32d. The distance between each of the two groove portions 34a, 34b of the square and a respective closest one of the two long edges 32a, 32b is the same. The distance between each of the two other groove portions 34c, 34d of the square aperture and a respective closest one of the two shorter edges 32c, 32d is also the same.

The mounting plate 20 has six slots 36a-f located therethrough, via which each blade carrying member 18a-d and associated blades 10a-f engage. Four of the six are respectively located adjacent and parallel to a respective groove portions 34a-d of the square groove 34a-d. Two of the six are respectively located adjacent and parallel to the two shorter edges 32c and 32d of the mounting plate 20. The slots 36a-f are located so that blades 10a-f are carried in positions so that a square or rectangular cut-out can be produced by simultaneous cutting action of the blades. The blades 10a, 10b extend and cut longitudinally with the slots.

The mounting plate 20 has a mount for the cylindrical block 24 in the form of a cylindrical pin 39. When the sawing device is assembled, the cylindrical pin 39 extends into the recess in the cylindrical block 24 such that the cylindrical block 24 and the pin 39 are coaxial. An annular bearing piece may be located between the surface of the recess and the pin 39 to reduce friction. The cylindrical block 24 is thus mounted to spin on the cylindrical pin.

Returning to FIG. 3, reciprocating wall 26a-d has an L-shaped sliding portion 42a-d, which sits in the square groove 34a-d and is able to slide therein. Each reciprocating wall 26a-d is thus configured to engage with a respective one of the grooves 22a-d in the inner housing 14 so as to allow sliding movement of the reciprocating wall, but to prevent movement in other directions. The sliding movement is approximately tangential to the cylindrical block 20. To facilitate sliding movement in the grooves 22a-d, an upper surface of each reciprocating wall 26a-d has an elongate recess therein in which a plurality of ball bearing 55a-d are located. When the inner housing 14 is located over the mounting plate 20 so as to enclose the reciprocating walls 26a-d, the ball bearings protrude into the grooves 22a-d in the inner housing 14, such that the reciprocating walls 26a-d can slide between the grooves 22a-d and groove portions 34a-d in a low friction manner.

Each reciprocating wall 26a-d has a linking surface 44a-d facing the cylindrical block 24. Each linking surface 44a-d has a respective force transmission groove 46a-d therein extending diagonally in the linking surface, that is, neither in a direction completely parallel to the direction of sliding movement with respect to the sliding surface nor in a direction completely perpendicular to the direction of sliding movement.

The surface 24a of the cylindrical block 24 and each wall 26a-d are spaced such that the respective ball bearing 30a, 30b engages in the respective force transmission groove 46a-d. The channel 28 and each force transmission groove 46a-d are arranged, together with the respective ball bearing 30a, 30b, to cooperate so that rotation of the cylindrical block 20 causes the ball bearing to run back and forth in the force transmission groove, which requires the respective reciprocating wall 26a-d to slide back and forth along the respective groove portion 34a-d.

The blade carrying parts 18a-d comprise two first blade carrying parts 18a, 18b and two second blade carrying parts 18c, 18d. The first blade carrying parts 18a, 18b are each configured to attach to a respective blade 10a, 10b through a respective associated one of the slots 36a, 36b between the square groove 34a-d and a one of the longer edges of the mounting plate 20. The first blade carrying parts 18a, 18b are each attached to a respective adjacent reciprocating wall 26a, 26b, such that reciprocating movement of the walls 26a, 26b causes corresponding reciprocating movement of the respective blade carrying part 18a, 18b and thus the associated blade 10a, 10b.

The first blade carrying parts 18a, 18b are each in the form of attachment means comprising a plate attached to a surface of the associated reciprocating wall 26a, 26b at a first end thereof with screws, for example. The plate extends through the associated slot 36a-d, engaging with the blade 10a, 10b that it carries. The plate and the manner of engagement with the blade that each plate carries will be described in greater detail below.

The second blade carrying parts 18c, 18d are each capable of carrying two blades, although only one blade is carried at any one time. Each of the second blade carrying parts 18c, 18d attaches to a respective blade 10c-f through a slot 36c-f in the mounting plate 20. The second blade carrying parts 18c, 18d include a sliding plate 17a, 17b extending from the associated reciprocating wall 26c, 26d over the mounting plate 20 to the slots 36c, 36d adjacent the short edges of the mounting plate 20. The sliding plate 17a, 17b is joined to the associated reciprocating wall 26c, 26d, such that movement of the wall 26c, 26d causes corresponding sliding movement of the sliding plate on the mounting plate 20.

Each sliding plate 17a, 17b has a pair of slits 43a-d therein aligning with a respective one of the slots 36c-f so that an attachment means of the second blade carrying part 16c, 16d can attach to the blade 10c-f that it carries. The attachment means in the same form as the attachment means of the first blade carrying parts 18a, 18b. The attachment means that extends through the slit 43d and slot 36d adjacent the groove portion 34d is attached at one end thereof to a respective reciprocating wall 26d and extends through the slit and slot for engagement with a blade. The attachment means of the second blade carrying means 26c, which extends through the slit 43c and slot 36c, is attached and extends in an analogous way.

Each second blade carrying means 16c, 16d also includes a wall (not shown) extending perpendicularly from the sliding plate 17a, 17b adjacent the shorter edges 32c, 32d of the mounting plate 20. Attachment means (not shown) in the same form as the attachment means of the first blade carrying parts 16a, 16b is attached at a first end to the wall and extends through a one of the slits 43e, 43f and corresponding slots 36e, 36f for engaging and carrying a blade.

In the present embodiment, each sliding plate 17a, 17b, the respective reciprocating walls 26a-d and the sliding portion 42a-d are formed of a single piece. In alternative embodiments, the reciprocating wall 26c, 26d can be separate from the corresponding blade carrying part 16a-d, but coupled to transfer repetitive reciprocating motion thereto, so as to impart such motion to the four of the blades 10a-f that are attached.

Figure 6:
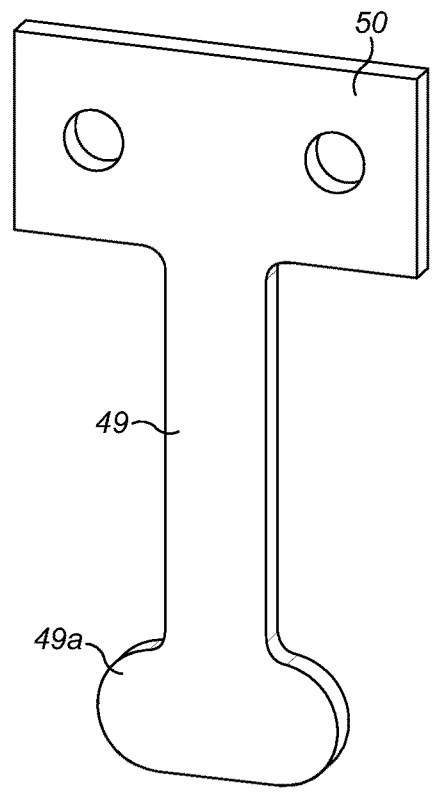
FIG. 6 is a perspective front view of a part of a blade carrying part of the sawing device for use in attaching the saw blade shown in FIG. 7 to the rest of the sawing device.

Referring to FIG. 6, each attachment means, indicated at 49, is for engaging with a blade and comprises a plate, as already mentioned. The plate is attached to one of the reciprocating walls 26ad, or the other wall extending perpendicularly from the sliding plate, at a first end thereof, and forms an arm for extending through a one of the slots 36a-f, and where appropriate one of the slits 43c-f. The arm ends in a bulbous portion 49a in the shape of a dovetail or the like.

Figure 7:
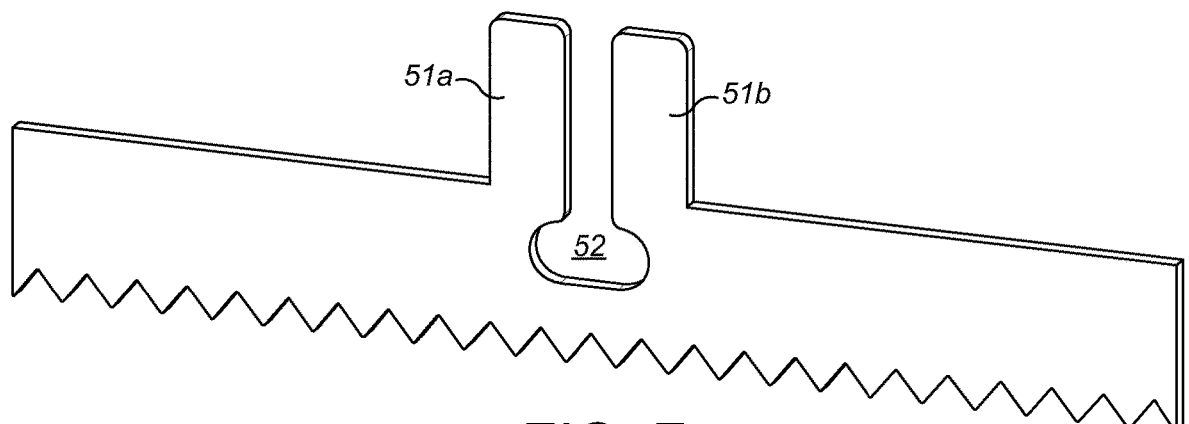
FIG. 7 is a perspective front view of a saw blade for use in the sawing device.

Referring to FIG. 7, each blade 10a-d has blade attachment means in the form of a recessed region 52 and a pair of parallel limbs 51a, 51b leading from the recessed region 52. The shape of the region between the limbs 51a, 51b together with the recessed region 52 is the same shape as that of the arm 49. The limbs 51a, 51b can be inserted in the associated slot over the arm 49 and the arm 49 flexed to allow this, until the end 49a of the arm snap-fits into the recessed region. In this position the attachment means 49 and the blade are attached. The parallel limbs 51a, 51b and the arm are respectively shaped so respective adjacent edges fit flush. This prevents movement of the blades 10a-d relative to the blade carrying part 16a-d.

Each of the blades 10a-10d is arranged having respective first and second ends, the first end of each blade lying adjacent to the second end of the blade displaced next to it. Reciprocating movement of the reciprocating wall 26a-d causes the blade carried by the respective attached blade carrying part 16c-d to move in a repetitive reciprocating motion, thereby to cause the blade to move in a repetitive reciprocating motion.

Each blade 10a-d is held in a fixed position by the blade carrying part, such that they simultaneously engage a surface of an object to be sawed. The slots 36a-f are sized to allow reciprocating movement of the corresponding plate 40a-d.

Typically it is desired to cut a rectangular opening of a particular size, for example in plasterboard to allow electrical wiring for a double plug socket to pass. Blades 10a-d enable this. However, it is also often desired to cut a square opening of a particular size, for example in plasterboard to allow electrical wiring for a single plug socket to pass. The longer blades 10a, 10b can be replaced with blades of the same size as the blades 10c, 10d and the blades 10c and 10d removed and replaced with blades 10e and 10f to enable this.

Each of the blade carrying parts 18a-d, the reciprocating plates 40a-d and the projections 42a-d have dimensions permitting reciprocating motion without collision with an adjacent part.

In operation, the rotary drive shaft 12a, 12b rotates about its central axis. Since each ball bearing 30a, 30b is restricted in movement by the respective force transmission groove 46a-d, each ball bearing 30a-30d can move only in the groove. Thus rotation of the rotary drive shaft 12a, 12b causes oscillatory movement of the ball bearing 30a, 30b parallel to the axis of the drive shaft 12a, 12b in the groove 28. In order for such movement to occur, the ball bearing 30a, 30b must move a same distance in the respective force transmission groove 46a-d. This movement imparts repetitive reciprocating movement to the reciprocating wall 26a-d, wherein the sliding portion 42a-d moves in a side of the square groove 34a-d. The reciprocating walls 26a-d move laterally and approximately tangentially relative to the axis of the cylindrical block 24. Such movement of the reciprocating wall 26a-d causes corresponding movement of the blade carrying member 18a-d, which in turn causes corresponding movement of the respective blade 10a-d. The movement of the reciprocating walls 26a-d is such that the second end of each blade approaches the first end of each blade, and the first end of each blade approaches the second end of each blade in an alternating sequence.

The sawing device is preferably configured such that the path of each blade substantially meets the path of the respective adjacent blade to form a notional apex. Thus, a portion of an object can be cut out. Notably, if the length of the blades is such that the respective paths do not quite meet, the portion of an object can still be pushed out. Preferably the paths of the blades are such that they substantially meet, that is, they at least come sufficiently close to enable a cut shape to be pushed or tapped out of a cut object. Also, if the path of a blade extends to cross the path of an adjacent blade, this is acceptable since a portion of an object will still be able to be cut out. Thus the paths of the ends of each blade may overlap the path of the ends of next adjacent blades, but not such that reciprocating movement of an adjacent blade is impeded.

A saw blade may be replaced by flexing the arm 49 to allow release of the blade 10a-f. A new saw blade may be inserted by flexing the arm 49 and sliding the limbs of the blade attachment means over the arm until the arm 49 and the limbs engage.

Several parts in the sawing device slide over one another at high speed. Suitable lubricant is provided between such parts, as will be apparent to the skilled person.

Figure 8:
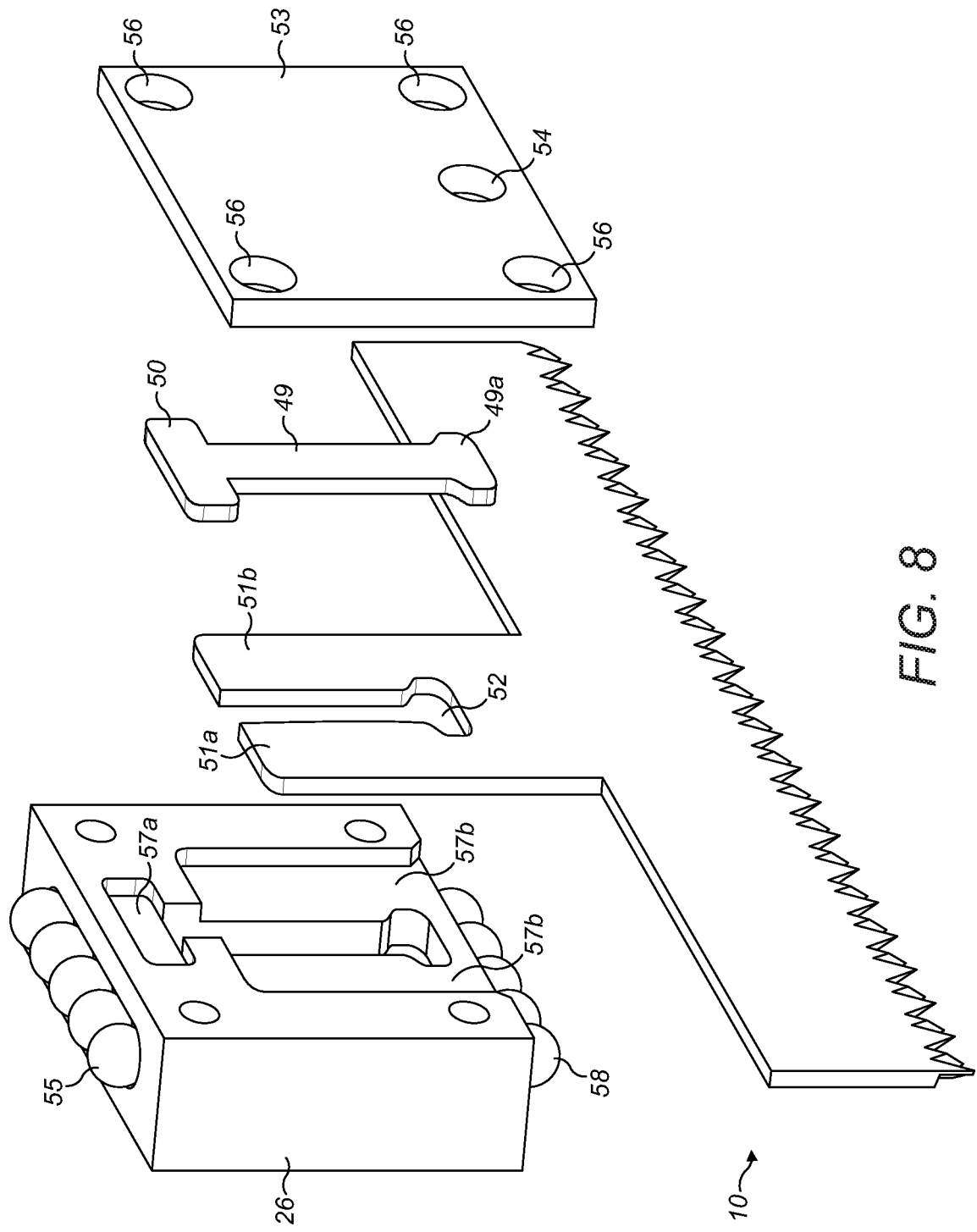
FIG. 8 is an exploded view of parts of a sawing device in accordance with a variant embodiment, including a blade carrying part and a blade.

In a variant embodiment, the blades 10a-f, the wall 26a-d, the blade carrying parts 18a-d differ to those described above, as indicated in FIGS. 8, 9 and 10. The blade carrying part is partly formed in the back of the wall 26a-d, in that the wall is recessed to receive the arm 49, and the limbs 51a, 51b of the blade 10. The arm 49, as mentioned above, has a bulbous end 49a, and the other end thereof forms a hammerhead 50. A first part of the recess in the wall 26 is shaped to receive the hammerhead 50. The recess is also shaped to include a neck through which the rest of the arm 49 depends. The arm 49 extends through the neck into a larger part of the recess, which is also shaped to receive the limbs 51a, 51b. The larger part of the recess has two depths, arranged such that the arm 49 can be pushed deeper than the limbs 51a, 51b. The limbs 51a, 51b can gain entry to the larger party of the recess when the arm is depressed. When the arm 49 is released, the arm 49 engages between the limbs 51a, 51b, including the bulbous part 49a of the arm engaging into the recess 52 from which the limbs extend. As can be understood from FIG. 8, an outer surface of the arm and limbs 51a, 51b, and the wall 26 are coplanar when the blade is secured in the attachment means.

A cover plate 53 attaches to the back of the wall 26 by means of screws through holes 56 in the cover plate 53, although other means of attaching the cover plate are suitable. The blade 10 can be attached and detached while the cover plate 53 is in place, but depressing the arm 49 can be depressed by pressing through an aperture 54 in the cover plate 53.

Figure 9:
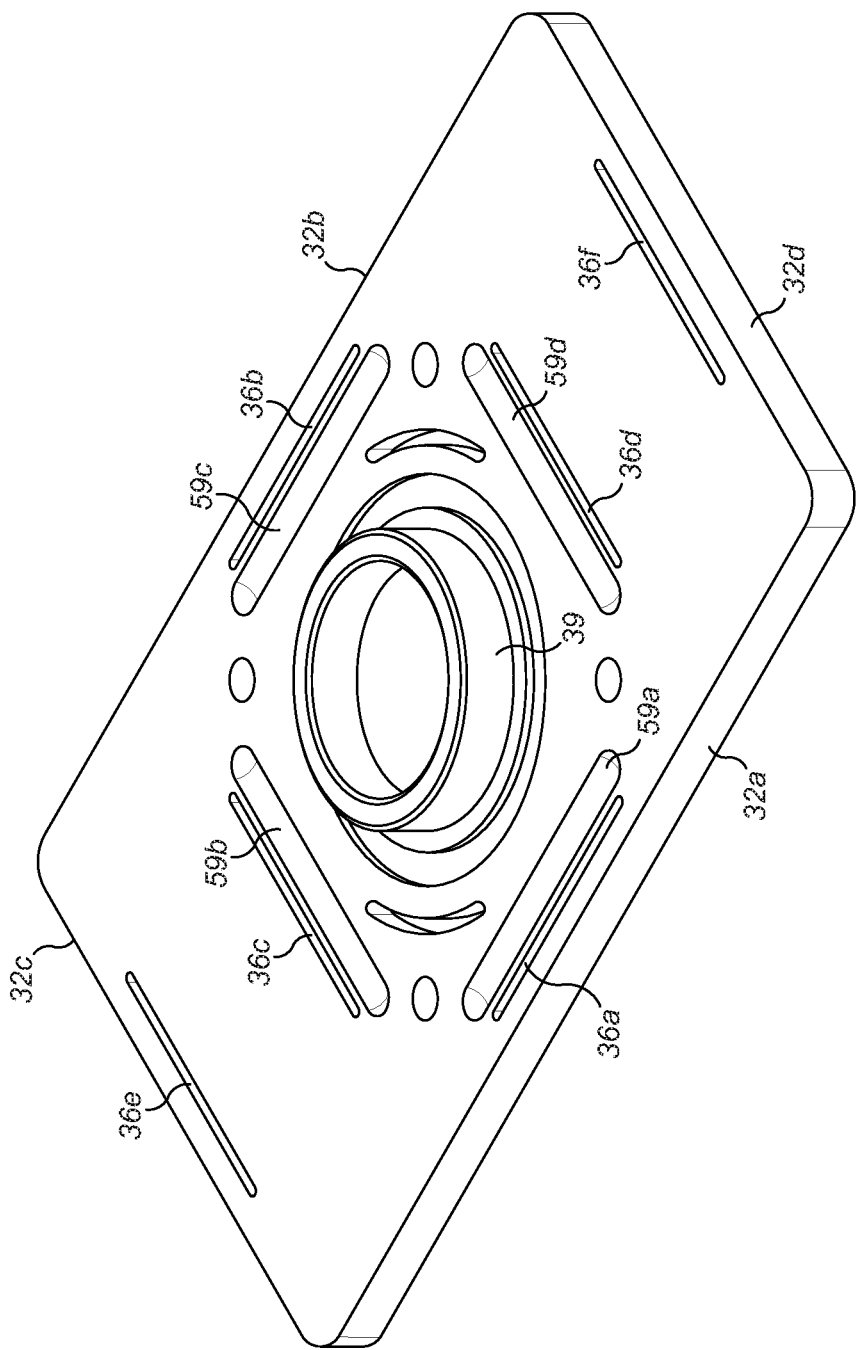
FIG. 9 is a view of a mounting plate for use with the parts shown in FIG. 8.

Referring also to FIG. 9, the mounting plate and wall 26 is modified to retain ball bearings 56 between them. In this case, the mounting plate includes grooves 59*a-d* in place of a previously mentioned square groove in which the ball bearings 56 move in a reciprocating linear motion. The wall 26 does not include a sliding portion 42.

Figure 10:
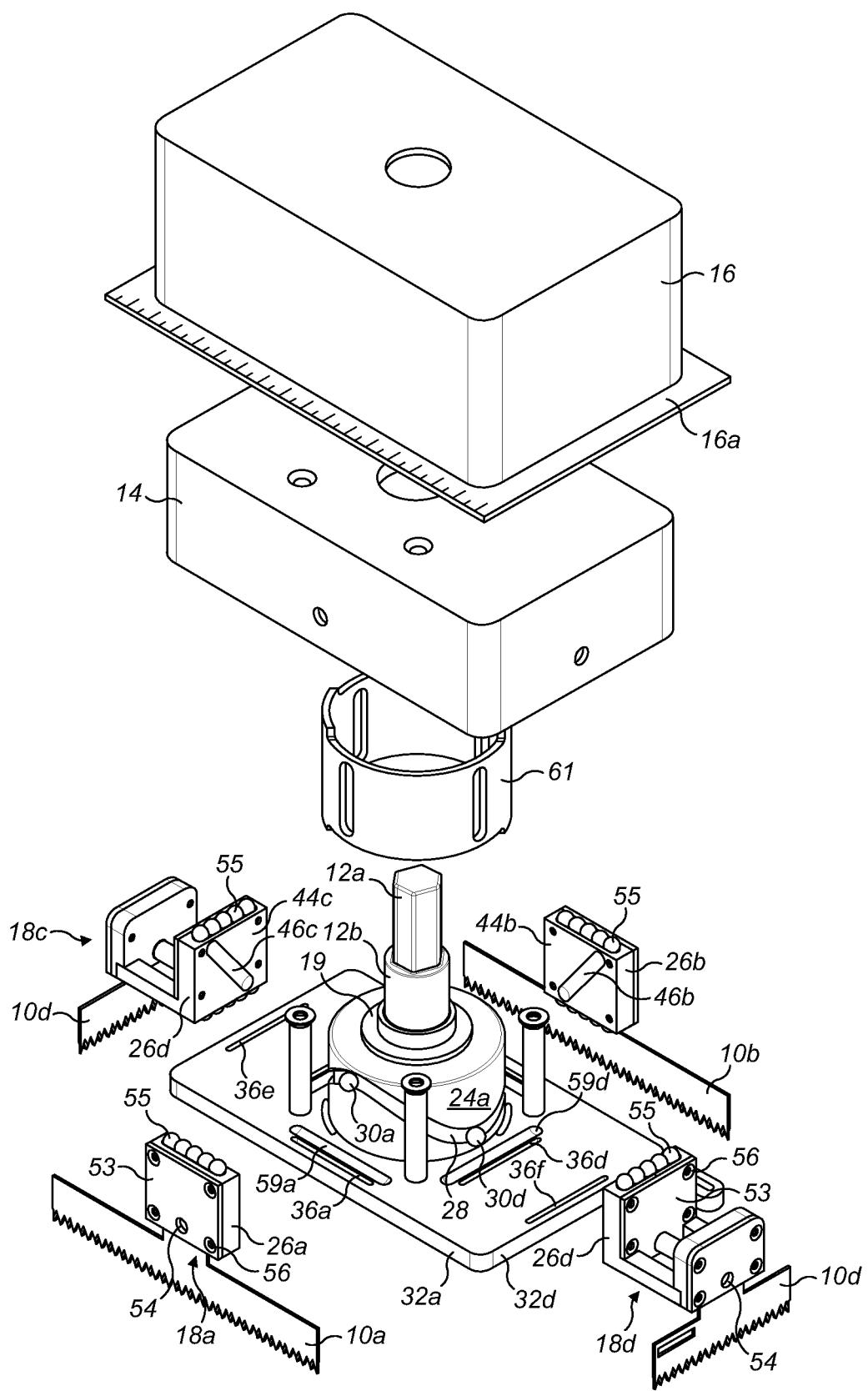
FIG. 10 is an exploded view of the sawing device of the variant embodiment.

As can be seen in FIG. 10, in this variant embodiment the sawing device includes a sleeve 61 located around the cylindrical block. The sleeve 61 has four elongate slots therein. The slots are sized and located such that a ball bearing can move in each of the slots. The sleeve 61 thereby guides movement of the ball bearings 30*a-d*.

Four bolts and bolt sleeves are also shown in FIG. 10, which attach the inner housing 14 to the mounting 20.

The variant embodiment operates in a similar manner to that already described. To replace a saw blade, the arm 49 is flexed by putting a pointed object through the aperture 54 of the cover plate 53.

In other embodiments, rotational motion of a shaft may be converted to linear repetitive reciprocating movement, or vice versa, using the same principle of two parts (wall and block) having facing surfaces, each surface having a groove therein and a ball bearing part located in each groove, wherein the grooves and the ball bearing are configured to cooperate to impart force from one groove to another. However in such other embodiments, the block is not cylindrical. For example the block may be frusto-conical. The block may be any shape in which the radial distance of the groove from a central axis is constant. The shape of the wall 26*a-d* may be modified so that the groove therein is a constant distance from the groove of the block. In embodiments, the grooves may not be spaced by a constant distance and the ball bearing may be out of the groove in the wall for a part of its oscillation.

Figure 11:
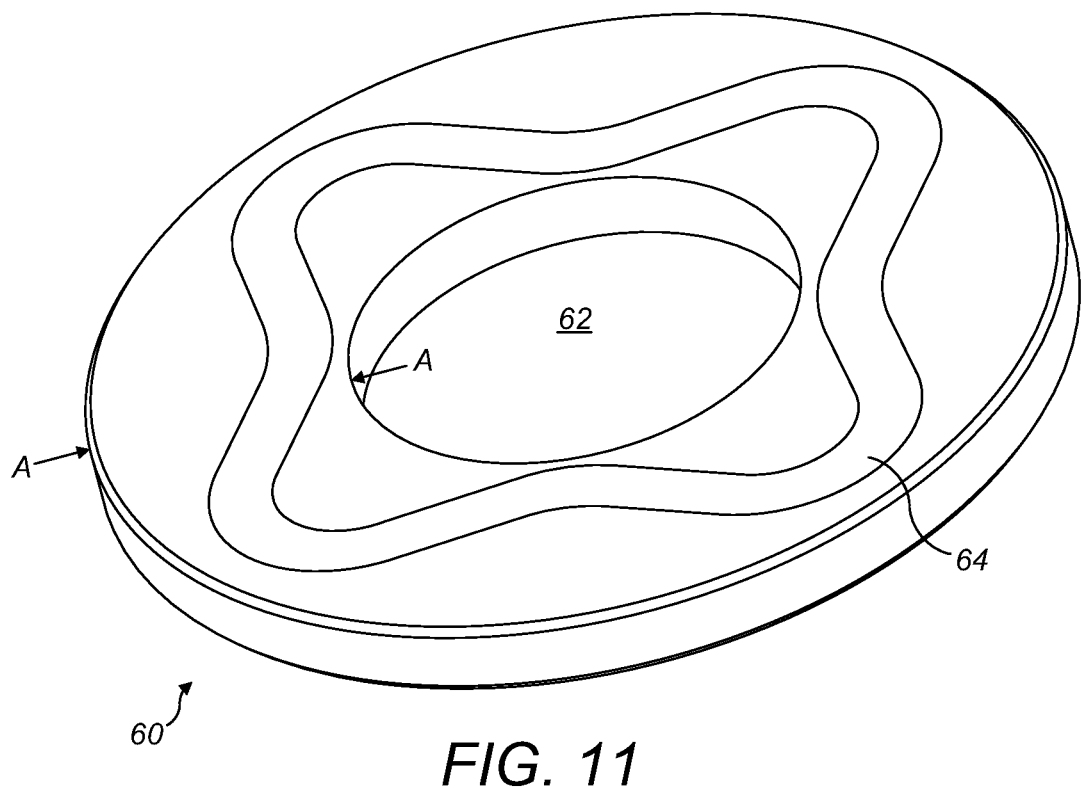
FIG. 11 is a view of a disc for use in another embodiment.

In another embodiment, instead of a cylindrical block, a disc including a circular or annular surface is provided. The disc has a continuous groove therein extending in an oscillatory manner in a loop on a surface thereof. Referring to FIG. 11, the circular disc 60 can be attached to a rotatable shaft (not shown) by engagement in an aperture 62 through the disc 60. The rotatable shaft is attached so that, when the shaft rotates, the disc rotates about its center in a planar manner, the shaft having an axis normal to the plane of the disc. The disc 60 has a groove 64 therein extending continuously around the axis between the aperture 60 and an edge 64 of the disc 60. In an arrangement for converting rotational motion to linear motion, the disc is mounted on the rotatable drive shaft and the shaft is mounted on a support such that the disc can rotate. A wall, like the wall 26 described above is also mounted on the support, the support and the wall are configured so that movement of the wall is restricted to movement in a linear, reciprocating repetitive manner in a direction lateral to the axis of the rotatable shaft. A surface of the wall has a groove therein, located diagonal in relation to the direction of movement of the wall, and which faces the groove 64 of the disc 60 and is close thereto. A ball bearing is part located in both grooves to enable transmission of force.

In operation, rotation of the disc causes linear reciprocating movement of the wall in a manner similar to that described above. The ball bearing is caused to oscillate back and forth in a substantially radial direction on the disc due to the restricted ability of the wall to move. This oscillating movement causes the wall to move at least partly laterally relative to the axis and in a direction spaced from the plane of the disc. The arrangement including the disc may be included in a sawing device, whereby rotational movement of a drive shaft is converted to linear repetitive reciprocating movement of saw blades.

As well as enabling converting of rotary to linear motion, the arrangement may, additionally or alternatively, be used to convert linear motion to rotary motion of the shaft.

It will be understood by the skilled person that various modifications are possible to the embodiments described above.

The shape to be cut out of an object, for example a plasterboard, can be predetermined to be other than a rectangle or a square. For example, the sawing device can be modified to carry three, five or six, seven or eight blades, or a greater number, with a corresponding number of blade carrying parts, to enable a triangle, pentagon, hexagon, heptagon or octagon to be cut out. Other shapes could be cut out with a previously mentioned number of blades, for example the sawing device could be configured for cutting of a rhombus with four blades. With respect to use of the word rectangular in the claims, it should be understood that the term "square" is a special case of a "rectangle".

The device may also have just two blades, preferably of the same length and spaced in a parallel manner by a distance equal to their length. This could be used to achieve cutting of a square or rectangle, and would advantageously mean that the device could have fewer parts.

Also, the blade carrying parts might be mounted on the mounting plate such that the motion converting arrangement causes reciprocating motion back and forth on a curved path. Thus, the sawing device can be configured such that, with curved blades, circular holes could be cut.

In a modification, the sawing device can be modified so that one linking means, for example in the form of one ball bearing, causes reciprocating motion of more than one blade.

In alternative embodiments, the number of peaks and the number of troughs can each be equal to or a multiple of the number of blades, so that when a first end of one blade moves towards a second end of an adjacent blade, the second end of the adjacent blade moves away from the first end of the one blade.

The linking means described above linking the bearing surface 24*a* of the cylindrical block 24 and the linking surface of the reciprocating wall 26*a-d* is a ball bearing which runs in grooves in the bearing surface and the linking surface, but other ways of linking the cylindrical block and the blade carrying parts 18*a-d* are possible. For example, a rail and runner arrangement may alternatively be used.

In modifications, the non-linear groove may not be of a zigzag form, but another kind of oscillation. The precise kind of oscillation can be optimized for best cutting action.

Various ways of adapting the blades and the blade carrying means so that the blades are fixedly held relative thereto are possible. For example, pairs of aligned slits and aligned slots may be present where single slits 36 and slots 43 are provided in the embodiments described above. The blades may be adapted to attach to attachment means of the sawing device via the pairs of slits and slots in any kind of snap-fit manner.

The sawing device described above is described as a device for cutting plasterboard. It will be appreciated by the skilled person that the sawing device could be applied to cut the surface of objects other than plasterboard. For example, the sawing device can be used to cut various kinds of sheet material, such as sheets or panels of wood, such as plywood or chipboards, plastic panels or conduits.

The sawing device may be provided with an elongate member attached or attachable to the outer housing 16. The member is of a predetermined or adjustable length, and can be positioned to enable the height from the ground of a cut-out in a wall or largely vertical wall or panel to be predetermined.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A sawing device, comprising:
   a plurality of blade carrying mechanisms, wherein the blade carrying mechanisms are configured so that reciprocating movement of the plurality of blade carrying mechanisms causes simultaneous repetitive reciprocating cutting action of a plurality of saw blades attached thereto;
   wherein the plurality of blade carrying mechanisms are configured to allow the plurality of saw blades to be detachably attached at four places so that the plurality of saw blades are disposed in a square formation and a correspondingly square-shaped portion can be sawed by simultaneous repetitive reciprocating cutting action of the plurality of saw blades attached thereto, when applied to a surface of an object to be cut; and
   wherein at least one of the blade carrying mechanisms is configured so that at least one of the plurality of saw blades can be detachably attached at another place thereon, thereby enabling the plurality of attached saw blades to be disposed in a rectangular formation different to the square formation and a correspondingly rectangular-shaped portion to be sawed different in shape to the square-shaped portion by simultaneous repetitive reciprocating cutting action of the saw blades attached thereto, when applied to a surface of an object to be cut.

2. The sawing device of claim 1, wherein the plurality of saw blades comprises a first set of four saw blades of equal length and a second set of saw blades including two of the first set of saw blades and two additional saw blades, each of the two additional saw blades being of equal length to one another and being longer than the two of the first set of saw blades.

3. The sawing device of claim 1, wherein the plurality of blade carrying mechanisms consists of four blade carrying mechanisms, wherein two of the blade carrying mechanisms are each configured so that a blade can be attached at a respective one of the four places and a respective one of the other places, and the other two of the blade carrying means are each configured so that a saw blade can be attached at a respective one of the four places.

4. The sawing device of claim 1, further comprising, in use, four saw blades.

5. The sawing device of claim 1, further comprising:
   a rotary drive shaft;
   a converter to convert rotational motion of the rotary drive shaft to repetitive reciprocal movements of the plurality of blade carrying mechanisms.

6. The sawing device of claim 5, wherein the rotary drive shaft has an axis and the axis extends in a direction of a center of mass of the sawing device.

7. The sawing device of claim 5, further comprising:
   a support;
   a rotatable piece mounted on the support and rotatable relative to the support about a central axis thereof, wherein rotation of the rotatable piece is caused by rotation of the rotary drive shaft;
   a plurality of reciprocating members mounted on the support, the support permitting reciprocating movement of the members;
   for each member, a link linking the respective member and the rotatable piece, wherein the link, the respective member and the rotatable piece are configured to cooperate so that rotational motion of the rotatable piece causes reciprocating movement of the respective member, wherein the reciprocating movement of the plurality of members causes corresponding movement of the plurality of blade carrying mechanisms, which causes corresponding movement of the attached saw blades.

8. The sawing device of claim 1, wherein each blade has respective first and second ends, the first end of each blade lying adjacent to the second end of the blade disposed next to it, whereupon in use the second end of each blade approaches the first end of the adjacent blade, and the first end of each blade approaches the second end of the blade next to it in alternating sequence.

9. The sawing device of claim 8, configured such that a path of each saw blade substantially meets the path of the respective adjacent saw blade to form a notional apex.

10. A sawing device, comprising:
    a mounting plate having:
       a first pair of parallel opposing blade slots;
       a second pair of parallel opposing blade slots; and
       a third pair of parallel opposing blade slots, each of the second and third pairs of parallel opposing blade slots being orthogonal to the first pair of parallel opposing blade slots;
    a drive shaft having a cylindrical block connected to the mounting plate and rotatable relative to the mounting plate about a central axis thereof, wherein rotation of the cylindrical block is caused by rotation of the drive shaft;
    a first pair of opposing blade carrying mechanisms configured to detachably receive and support a first pair of blades, the first pair of blade carrying mechanisms being drivable by the cylindrical block for reciprocating movement of the first pair of blade carrying mechanisms on the mounting plate and corresponding reciprocating movement of the first pair of blades along the first pair of parallel opposing blade slots;

a second pair of opposing blade carrying mechanisms configured to detachably receive and support a second pair of blades, the second pair of blades being unequal in length to the first pair of blades, the second pair of blade carrying mechanisms being drivable by the cylindrical block for reciprocating movement of the second pair of blade carrying mechanisms on the mounting plate and corresponding reciprocating movement of the second pair of blades along the second pair of parallel opposing blade slots;

the second pair of opposing blade carrying mechanisms being further configured to receive and support the second pair of blades for reciprocating movement along the third pair of parallel opposing blade slots;

the first pair of opposing blade mechanisms further being configured to receive and support a third pair of blades, the third pair of blades and the second pair of blades being equal in length;

whereby the blades are selectively configurable to enable the cutting of a rectangular shape when the first set of blades are attached for reciprocating movement along the first pair of opposing parallel slots and the second set of blades are attached for reciprocating movement along the second pair of opposing parallel slots, and to enable the cutting of a square shape when the third set of blades are attached for reciprocating movement along the first pair of opposing parallel slots and the second set of blades are attached for reciprocating movement along the third pair of opposing parallel slots.

11. The sawing device of claim 10, wherein the first pair of blades extends through the first pair of opposing parallel slots when the first pair of blades is attached to the first pair of opposing blade carrying mechanisms.

12. The sawing device of claim 10, wherein the each of the first, second, and third pairs of opposing parallel slots extends through the mounting plate.

13. The sawing device of claim 10, wherein the mounting plate further comprises a cylindrical pin, the cylindrical block being supported for rotation about the cylindrical pin.

14. The sawing device of claim 10, wherein the drive shaft has an axis and the axis extends in a direction of a center of mass of the sawing device.

15. The sawing device of claim 10, further comprising a housing surrounding the mounting plate and the cylindrical block.

16. A sawing device, comprising:
a mounting plate;
a drive shaft having a cylindrical block connected to the mounting plate and rotatable relative to the mounting plate about a central axis thereof, wherein rotation of the cylindrical block is caused by rotation of the drive shaft;

a first pair of opposing blade carrying mechanisms configured to detachably receive and support a first pair of blades in a first spaced-apart and parallel relationship, the first pair of blade carrying mechanisms being drivable by the cylindrical block for reciprocating movement of the first pair of blade carrying mechanisms on the mounting plate and corresponding reciprocating movement of the first pair of blades;

a second pair of opposing blade carrying mechanisms configured to detachably receive and support a second pair of blades in a second spaced-apart and parallel relationship, the second pair of blades being unequal in length to the first pair of blades, the second pair of blade carrying mechanisms being drivable by the cylindrical block for reciprocating movement of the second pair of blade carrying mechanisms on the mounting plate and corresponding reciprocating movement of the second pair of blades in a direction perpendicular to the reciprocating movement of the first pair of blades;

the second pair of opposing blade carrying mechanisms being further being configured to receive and support the second pair of blades in a third spaced-apart and parallel relationship, the second pair of blades being relatively closer to one another when positioned in the third spaced-apart and parallel relationship than when positioned in the second spaced-apart and parallel relationship;

the first pair of opposing blade mechanisms further being configured to receive and support a third pair of blades;

whereby the blades are selectively configurable to enable the cutting of a rectangular shape when the first set of blades are attached to the first pair of opposing blade carrying mechanisms for reciprocating movement and the second set of blades are attached to the second pair of opposing blade carrying mechanisms for reciprocating movement, and to enable the cutting of a square shape when the third set of blades are attached to the first pair of opposing blade carrying mechanisms for reciprocating movement and the second set of blades are attached to the third pair of opposing blade carrying mechanisms for reciprocating movement.

* * * * *